(12) United States Patent
Reynolds et al.

(10) Patent No.: US 8,450,449 B2
(45) Date of Patent: May 28, 2013

(54) MULTI-COLORED CONJUGATED POLYMERS WITH HIGHLY TRANSMISSIVE OXIDIZED STATE

(75) Inventors: John R. Reynolds, Gainesville, FL (US); Pengjie Shi, Gainesville, FL (US); Jianguo Mei, Greensboro, NC (US); Chad Martin Amb, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 13/111,350

(22) Filed: May 19, 2011

(65) Prior Publication Data

US 2011/0288253 A1   Nov. 24, 2011

Related U.S. Application Data

(60) Provisional application No. 61/347,091, filed on May 21, 2010.

(51) Int. Cl.
*C08G 75/00* (2006.01)

(52) U.S. Cl.
USPC ........................................ 528/377; 528/380

(58) Field of Classification Search
CPC ...................................... C08G 75/00
USPC ............................... 528/377, 380
See application file for complete search history.

(56) References Cited

FOREIGN PATENT DOCUMENTS

WO    WO 2011/003076 A2    1/2011

OTHER PUBLICATIONS

Reynolds et al. (Nature Materials vol. 7 Oct. 2008, p. 795-799).*
Icli et al. (Organic Electronics 11 (2010) 1255-1260).*
Park et al. (Journal of Polymer Science: Part A: Polymer Chemistry, vol. 46, 6175-6184, 2008).*
Amb, C.M. et al. "Spray-Processable Blue-to-Highly Transmissive Switching Polymer Electrochromes via the Donor-Acceptor Approach" *Adv. Mater.*, 2009, 21:1-5.
Beaujuge, P.M. et al. "The donor-acceptor approach allows a black-to-transmissive switching polymeric electrochrome" *Nature Materials*, Oct. 2008, 7:795-799.
Havinga, E.E. et al. "Alternate Donor-Acceptor Small-Band-Gap Semiconducting Polymers; Polysquaraines and Polycroconaines" *Synthetic Metals*, Mar. 1993, 55(1):299-306.

* cited by examiner

*Primary Examiner* — Shane Fang
(74) *Attorney, Agent, or Firm* — Saliwanchik, Lloyd & Eisenschenk

(57) ABSTRACT

Embodiments of the invention are directed to random conjugated copolymers comprising a plurality of one or more different donor (D) repeating units and a plurality of at least one acceptor (A) repeating unit. At least one of the D units has a solubilizing substituent, statistically a portion of the A repeating units are separated from each other by only one D units and a plurality of the A unit are adjacent to one the D units having the solubilizing substituents. The random conjugated copolymers are black or colored in the neutral state and highly transmissive in the oxidized state. The random conjugated copolymers have the structure $\text{-}[(D)_xA]_n\text{-}$, where $x>1$ and $n(x+1) \geq 10$ or the structure $\text{-}[(DA)_x\text{-}(D'A)_y]_n\text{-}$, where D represents one substituted D unit and D' represents another D units and where $x \geq 1$, $y \geq 1$ and $2n(x+y) \geq 10$. Other embodiments of the invention are directed to forming the $\text{-}[(D)_xA]_n\text{-}$ or $\text{-}[(DA)_x\text{-}(D'A)_y]_n\text{-}$ random conjugated copolymers by condensation polymerizations between monomers containing complementary reactive groups.

4 Claims, 9 Drawing Sheets

MULTI-COLORED CONJUGATED POLYMERS WITH HIGHLY TRANSMISSIVE OXIDIZED STATE

CROSS-REFERENCE TO RELATED APPLICATION

The present application claims the benefit of U.S. Provisional Application Ser. No. 61/347,091, filed May 21, 2010, which is hereby incorporated by reference herein in its entirety, including any figures, tables, or drawings.

The subject invention was made with government support under the Air Force Office of Scientific Research, Contract No. FA9550-09-1-0320 and the Office of Naval Research, Contract No. N00014-10-1-0454. The government has certain rights to this invention.

BACKGROUND OF INVENTION

Polymeric electrochromics capable of a fast and reversible color change upon electrochemical oxidation and reduction have received considerable attention over the past two decades. A particular emphasis has been placed on incorporating the most stable of these electrochromic polymers (ECPs) in devices such as windows, mirrors (rear-view/side-view mirrors for cars) and displays, and other devices. Recently, synthetic conducting donor-acceptor (DA) polymers were demonstrated to have good performance as electrochromic polymers (ECPs).

The "donor-acceptor" (DA) approach, first reported for macromolecular systems by Having a et al., *Synth. Met.* 1993, 55, 299, allows the tuning of ultraviolet, visible, and near-infrared absorption bands in conjugated polymers (CPs) by the alternation of electron-rich donor (D) and electron-poor acceptor (A) segments. In these DA-polymers, the acceptors are easier to reduce, while the donors are easier to oxidize. This approach has been used to tune the optical and electronic properties of CPs for applications such as field-effect transistors, light emitting diodes, and photovoltaics. To these ends, much effort has been directed to ECPs that are red, blue and green, the complimentary set of colors in the additive primary color space. Although ECPs of all of these colors have been prepared, often they lack in optical contrast, switching speed, stability, processability or scalability of fabrication.

A conjugated polymer with neutral state colors green, blue, or black, for use as an electrochromic material, requires an optical band gap lower than 1.75 eV. The DA approach has been used to achieve low-gap materials allowing band gap engineering of conjugated polymers for organic photovoltaics, field-effect transistors and light emitting diodes. Interestingly, DA polymers generally show two distinct optical absorption bands, which can be modulated as a function of the concentration of donor to acceptor moieties in the main chain. By tuning the dual-band absorption character of DA type polymers, desired colors can be achieved.

A facile synthetic approach to multi colored to transmissive electrochromic DA polymers has been possible via transition metal mediated polycondensation, as disclosed by the research group that includes the present inventors, Amb et al., *Adv. Mater.* 2009, 21, 1. Using common Suzuki polymerization conditions, an aryl diboronic ester and an aryl dihalide, are cross-coupled using palladium catalysis to produce strictly alternating polymers. Although saturated blue to transmissive polymers have resulted from this approach where regular polymers have been formed, more limited success has resulted for the production of saturated black to transmissive electrochromic polymers (ECPs) by the coupling of a single aryl distannane monomer with a single aryl dihalide. Achieving an even absorption over the entire visible spectrum (400-750 nm) in the fully neutralized state, while effectively bleaching out in the same region in the fully oxidized state, is inherently difficult. This has been achieved previously by the research group that includes the present inventors using random oxidative polymerization of a symmetric trimeric D-A-D species, Beaujuge et al., *Nat. Mater.* 2008. The synthesis of oligomeric species infers additional steps and their associated costs. Hence a simple design and method to yield saturated neutral state polymers of various colors, including a saturated black, by a readily scalable efficient process with high batch to batch reproducibility of the absorption spectra is desirable.

BRIEF SUMMARY

Embodiments of the invention are directed to random conjugated copolymers having a plurality of donor (D) repeating units and a plurality of acceptor (A) repeating units. The D units can be of a single structure or can be of a number of possible structures, but at least one of the D units in the random conjugated copolymer has a solubilizing substituent where, statistically, a portion of which are adjacent to an A units in the copolymer. There can be more than one type of A units, and the A units are separated from other A units by D units, where statistically a portion of the A units are separated by only one D unit. In some embodiments of the invention, the random conjugated copolymers have the sequence $-[(D)_x A]_n-$, where x is greater than 1. In other embodiments of the invention the random conjugated copolymers have the sequence $-(DA)_x-(D'A)_y-$, where D and D' are at least two different structural donor units and both x and y are greater than 1. The random conjugated copolymers according to embodiments of the invention are black or colored in the neutral state and are highly transmissive in the oxidized state.

The D units having the solubilizing substituent can be 3,4-alkylenedioxythiophene substituted on the alkylene bridge, 3,4-dialkoxythiophene, 3,6-dialkoxytheino[3,2-b]thiophene, 3,5-dialkoxy-dithieno[3,2-b:2',3'-d]thiophene, or alkylsubstituted thiophene units. The A unit can be benzo[c][1,2,5]thiadiazole, benzo[c][1,2,5]oxadiazole, quinoxaline, benzo[d][1,2,3]triazole, pyrido[3,4-b]pyrazine, cyanovinylene, thiazolo[5,4-d]thiazole, 1,3,4-thiadiazole, pyrrolo[3,4-c]pyrrole-1,4-dione, 2,2'-bithiazole, [1,2,5]thiadiazolo[3,4-c]pyridine, thieno[3,4-b]pyrazine, [1,2,5]oxadiazolo[3,4-c]pyridine, dicyanovinylene, [1,2,5]thiadiazolo[3,4-g]quinoxaline, 4-dicyanomethylenecyclopentadithiolene, benzo[c]thiophene or any derivatives of these units, for example substituted units.

Other embodiments of the invention are directed to methods of preparing random conjugated copolymers. In one embodiment of the invention at least two monomers provide D units and at least one of the monomers provides a substituted D unit of the type indicated above. One or more first D unit comprising monomers have a pair of first reactive groups and at least one of the first D unit comprising monomers provides a substituted D unit. One or more second D units comprising monomers have a pair of second reactive groups that are complementary to the first reactive group. In this embodiment of the invention, at least one monomer comprising an A unit of the type indicated above have a pair of the second reactive groups. The monomers are polymerized, where reaction between the first and second reactive groups yield a random conjugated copolymer of the structure $-[(D)_x A]_n-$, where $x>1$ and $n(x+1) \geq 10$. Polymerization reactions that can be used include, but are not limited to Stille coupling, Kumada coupling, Suzuki coupling, or Negishi coupling.

In another embodiment of the invention, a method of preparing a random conjugated copolymer involves providing at least two monomers comprising a D unit and a pair of first reactive groups, and at least one monomer comprising an A units of the type indicated above with a pair of the second reactive groups complementary to the first reactive groups. At least one of the monomers comprising a D unit, monomers with a first D unit, has a substituted D unit of the type indicated above. The monomers containing the D units and monomers containing the A units are polymerized by reaction between the first and second reactive groups to form a random conjugated copolymer having the structure -$[(DA)_x$-$(D'A)_y]_n$-, where D represents the first D units and D' represents other D units with $x \geq 1$, $y \geq 1$ and $2n(x+y) \geq 10$. Polymerization reactions that can be used include, but are not limited to Stille coupling, Kumada coupling, Suzuki coupling, or Negishi coupling.

DETAILED DISCLOSURE

Figure 1:
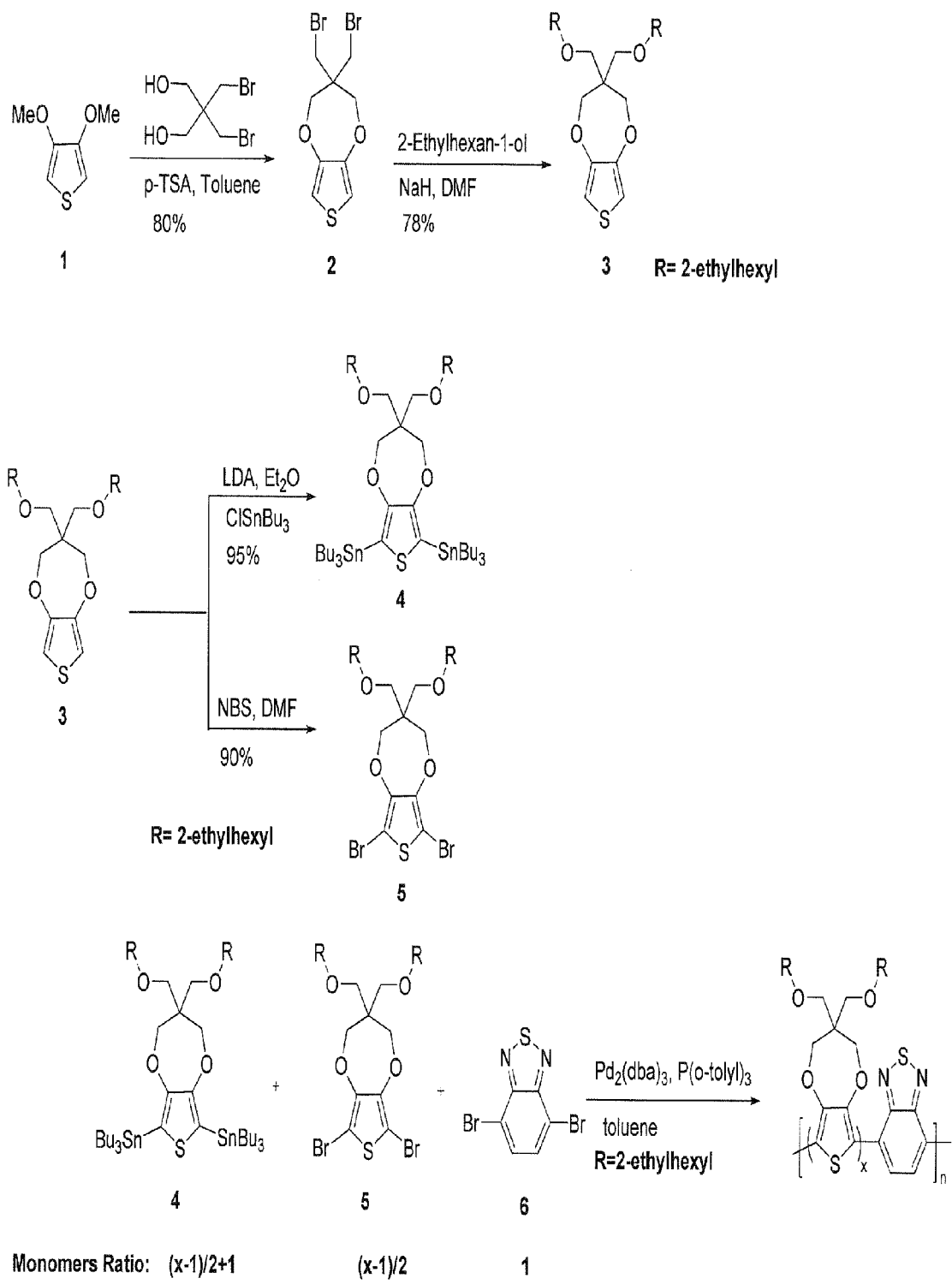
FIG. 1 shows a synthetic scheme for the preparation of a monomeric distannyl PropOT-$(CH_2OEtHx)_2$ (4), dibromo ProDOT-$(CH_2OEtHx)_2$ (5) and their polymerization with dibromo benzothiadiazole (BTD) to yield random conjugated copolymers according to an embodiment of the invention.

Embodiments of the present invention are directed to preparation of soluble random conjugated copolymers comprised of a plurality of at least one donor (D) repeating unit and a plurality of at least one acceptor (A) repeating units, where statistically a portion of A repeating units are separated from each other by only one D unit and where a plurality of A units are adjacent to D units having solubilizing substituents. The copolymers have 2 or more discernable repeating units with at least one D unit and at least one A unit. In one embodiment of the invention, the copolymer is comprised of two repeating units, one D unit and one A unit where the number of D units between A units is statistical. In another embodiment of the invention the copolymer comprises alternating D units and A units having a plurality of different D units. The A units comprise a single monocyclic or fused polycyclic aromatic unit. By varying the copolymer composition in the manner of one or more of the embodiments of the invention, the neutral state copolymer can be designed to have a black, red, green, blue, or other color. The polymer can have 10 or more repeating units. The soluble random conjugated copolymers herein are complementary to the alternating copolymers disclosed in Amb et al. "Soluble Alternating Donor-Acceptor Conjugated Polymer Electrochromes" PCT Patent Application Publication No. WO/2011/003076, Jan. 6, 2011 incorporated herein by reference.

In an embodiment of the invention, the soluble random conjugated copolymers are prepared by a method employing a Stille polymerization. In other embodiments of the invention other aryl-aryl cross-coupling methods, such as Kumada coupling, Suzuki coupling, and Negishi coupling can be employed to obtain the target copolymers. Those skilled in the art can readily identify the appropriate complementary reactive functionalities and which should be included within any given monomer to allow polymerization to the types of copolymers disclosed herein when employing a polycondensation reaction other than the Stille polymerization, which is used for all exemplary embodiments of the subject invention herein.

In some embodiments of the invention, the copolymeric sequence of the soluble random conjugated copolymer is a segment of a block copolymer, graft copolymer, or polymer network. For example, as can be appreciated from one skilled in the art, a triblock copolymer can be formed where a polymer mono-terminated in a D and/or an A unit can be used in a cross-condensation polymerization with other D and A monomers according to an embodiment of the invention, or where a portion of the polymer terminated D and/or A units are terminated at both ends to form a multiblock polymer, or where all polymer terminated D and/or A units are branched and terminated at a sufficient number of termini of the polymer such that a cross-linked network is formed upon polymerization. The other polymeric segments attached to the random conjugated copolymers that provides the electrochromic properties can be any polymer that can be prepared by a step-growth or chain-growth process and the non-random conjugated segments of the block copolymer, graft copolymer, or polymer network can be formed before, during or after the formation of the random conjugated copolymeric sequences, as can be appreciated by one skilled in the art. A random conjugated copolymer sequence can be transformed into a different copolymer by reactions at the random conjugated copolymeric sequences, for example, a transformation of the substituents on one or more of the donor units, or by reactions involving one or more units of another polymeric segment attached to the random conjugated copolymer sequence of a block copolymer, graft copolymer, or polymer network. The attachment of the random conjugated copolymeric sequence to other polymeric segments can be from a substituent on D or A mid units, or can be from an end unit of a copolymeric sequence. For example, a D unit and/or an A unit is terminal and its terminal functionality can undergo a bond forming reaction with a terminal end of polymeric segment or a monomeric species that can be converted into a terminal end or repeating unit of a polymeric segment. In other embodiments of the invention, at least one of the D units, A units, or terminal ends of the random conjugated copolymer sequence can be bonded to functionality that can self associate or cross-associate with plurally functional additives to form a super-molecular structure through non-covalent interactions such as hydrogen bonding, ion-dipole, ion pairing, ion chelation, dipole-dipole, or other non-covalent bonding forces. For example, some D units may be substituted with specific polyol groups that are readily solvated by a solvent, but strongly associates specifically with one or more other polyol groups of the random conjugated copolymer or of an additive upon removal of the solvent to form a super-molecular complex.

The novel random conjugated copolymers according to embodiments of the invention display high optical contrasts in the visible region and possess switching speeds and switching stability that are often superior to those which have been previously reported for electrochromic polymers (ECPs). These solution processable colored-to-transmissive polymers are advantageous for reflective and transmissive electrochromic devices (ECDs) due to the combination of the solubility, which allows lower fabrication costs and good scalability, and other physical properties that allow improved electro-optic and mechanical properties compared to traditional colored-to-transmissive ECP counterparts.

The soluble random conjugated copolymers are the product of a step growth polymerization between at least three monomers, where at least two monomers share the same reactive functionality and at least one monomer has a complementary functionality according to embodiments of the invention. In embodiments of the invention where a plurality of monomers have different D units and have like reactive functionality and a plurality of monomers have like A units and have complementary functionality, the resulting terpolymer has alternating D and A units where the different D units are randomly distributed along the chain. In like manner, in embodiments of the invention where a plurality of monomers have different acceptor units and have like reactive functionality and plurality of monomers have like donor units and have complementary functionality, the resulting terpolymer has alternating D and A units where the different A units are randomly distributed along the chain. In embodiments of the invention where a plurality of D unit containing monomers and all A unit containing monomers have like reactive functionality and a plurality of D containing monomer has the complementary functionality to the other monomers and has an identical D unit structure, the resulting copolymer has isolated A units separated by statistically distributed D units. In an embodiment of the invention, a plurality of different A unit containing monomers can be used when all A unit containing monomers have the same reactive functionality and a reactive functionality that is like to that of some D unit containing monomers and complementary to other D unit containing monomers.

Because A units can be isolated from each other by D units, and because as few as a single D unit can be situated between A units with any random distribution of D units or A units within the constraints of the various structural embodiments, the tuning of the resulting properties by the tuning of the copolymer composition allows the design of a copolymer with any desired opaque neutral color that becomes transparent with little or no color in the oxidized state. The required monomers are readily synthesized and isolated as they contain a single A or D unit comprising a single or a plurality of fused aromatic rings or heteroaromatic rings with bonds connecting the aromatic rings only formed upon polymerization of the monomers. No monomers employed are oligomeric in nature. Monomers that are oligomeric in nature requires additional synthetic steps and can be more difficult to obtain and use than those that are monomeric in nature. In this manner, polymerizations can be carried out over a wide scale and the desired stoichiometry can be readily achieved.

The D units used in embodiments of the invention include: 3,4-alkylenedioxythiophenes substituted on the alkylene bridge; 3,4-dialkoxythiophenes; 3,6-dialkoxytheino[3,2-b]thiophenes; 3,5-dialkoxy-dithieno[3,2-b:2',3'-d]thiophene; alkylsubstituted thiophene; or any combination thereof. Additionally, other D units can be included, where a repeating unit or number of repeating units are included as a thiophene or substituted thiophene or an oligothiophenes or substituted oligothiophene, such that the proportion of unsubstituted thiophene repeating units is insufficient to adversely affect the solubility and the electrochromic properties desired. Where a proportion of D units are 3,4-alkylenedioxythiophenes substituted on the alkylene bridge, 3,4-dialkoxythiophenes, 3,6-dial koxytheino[3,2-b]thiophenes, 3,5-dialkoxy-dithieno[3,2-b:2',3'-d]thiophene, and/or alkylsubstituted thiophene, and used in a sufficient amount, at least some of these D units are statistically adjacent to A units in the soluble random conjugated copolymer. For example, when about 10 to 100 mole percent of the D units are monomers with substitution, solubility can be achieved. In general, when the A unit is not substituted and, therefore, does not contribute to the solubility of the random conjugated copolymer, a greater proportion of substituted D units, for example about 25 to about 100 mole percent of all D units, is necessary for solubility.

Appropriate 3,4-alkylenedioxythiophene units have the structure:

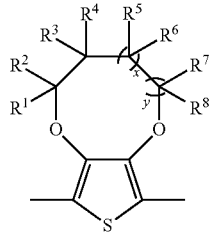

where x is 0 or 1, y is 0 or 1, and $R^1$, $R^2$, $R^3$, $R^4$, $R^5$, $R^6$, $R^7$ and $R^8$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_1$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester $NH_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ alkhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, or $C_3$-$C_{30}$ polyamidoester.

Appropriate 3,4-dialkoxythiophene units comprise:

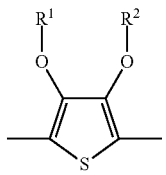

where $R^1$ and $R^2$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester $NH_2$, $C_1$-$C_{30}$ alkylamino, $C_6$-$C_{14}$ acylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ alkhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, or $C_3$-$C_{30}$ polyamidoester.

Appropriate 3,6-dialkoxytheino[3,2-b]thiophene and 3,5-dialkoxy-dithieno[3,2-b:2',3'-d]thiophene units have the structures:

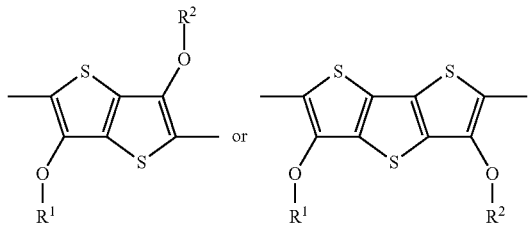

where $R^1$ and $R^2$ are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester $NH_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (aryl alkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ alkhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, or $C_3$-$C_{30}$ polyamidoester.

The A units that can be used in embodiments of the invention are electron-poor aromatic units, cyanovinylene, or dicyanovinylene units. Appropriate electron-poor aromatic units that comprise A units to achieve a conjugated polymer according to an embodiment of the invention, and give a desired opaque neutral color that becomes transparent with little or no color in the oxidized state, include, but are not limited to: benzo[c][1,2,5]thiadiazole; benzo[c][1,2,5]oxadiazole; quinoxaline; benzo[d][1,2,3]triazole; pyrido[3,4-b]pyrazine; cyanovinylene; thiazolo[5,4-d]thiazole; 1,3,4-thiadiazole; pyrrolo[3,4-c]pyrrole-1,4-dione; [1,2,5]thiadiazolo[3,4-c]pyridine; thieno[3,4-b]pyrazine; [1,2,5]oxadiazolo[3,4-c]pyridine; benzo[1,2-c;4,5-c']bis[1,2,5]thiadiazole; [1,2,5]thiadiazolo[3,4-g]quinoxaline; 4-dicyanomethylenecyclopentadithiolene; benzo[c]thiophene; or any derivative thereof. Those skilled in the art can readily choose appropriate A and D units or combination of units for a given desired color base on the known optical properties of these units in light of the disclosure herein with minimal experimentation.

In one embodiment of the invention, the random conjugated copolymers have the structure -[(D)$_x$A]$_n$- where on average x>1 where a plurality of D units separate the A units, where the D units are distributed randomly, for example by approximately a normal Flory-Schultz distribution, between the A units, and, necessarily, the copolymer contains at least some sequences of D units where x is 1. The A units can be one or more different A units. The D units necessarily include one or more of: 3,4-alkylenedioxythiophenes substituted on the alkylene bridge; 3,4-dialkoxythiophenes; 3,6-dialkoxytheino[3,2-b]thiophenes; 3,5-dialkoxy-dithieno[3,2-b:2',3'-d]thiophene; and alkylsubstituted thiophenesuch that a substituted thiophene is statistically adjacent to some or all of the A units.

In another embodiment of the invention, the random conjugated copolymers have the structure -[(DA)$_x$-(D'A)$_y$]$_n$- where D and A units alternate but at least two D units are randomly placed along the chain where, for example with a terpolymer, the length of a DA sequences and D'A sequences are defined by the proportion of D and D' repeating units and the (DA)$_x$ and (D'A)$_y$ sequences have approximately a normal Flory-Schultz distribution. At least one of the D and D' units, for example that designated D is: 3,4-alkylenedioxythiophenes substituted on the alkylene bridge; 3,4-dialkoxythiophenes; 3,6-dialkoxytheino[3,2-b]thiophenes; 3,5-dialkoxy-dithieno[3,2-b:2',3'-d]thiophene; or alkylsubstituted thiophene.

In one exemplary embodiment of the invention where the random conjugated polymer has the -[(D)$_x$A]$_n$- structure, a 2,5-dibromo-2-ethylhexyloxy-substituted 3,4-propylenedioxythiophene and 2,5-tributylstannyl-2-ethylhexyloxy-substituted 3,4-propylenedioxythiophene, both of which provide PropOT-(CH$_2$OEtHx)$_2$ D-units to the copolymer, and 4,7-dibromo-2,1,3-benzothiadiazole (BTD), which provides the A unit of the copolymer, are combined at different feed ratios where the concentration of bromo groups equals the concentration of the tributylstannyl groups. This provides two absorbance bands that, at a total donor/acceptor ratio of approximately 7/1, display balanced intensities having homogenous absorptions across most of the visible spectrum. The -[(PropOT-(CH$_2$OEtHx)$_2$)$_7$BTD]$_n$- random conjugated copolymer displays rapid and reversible switching from an opaque black neutral state to a highly transmissive oxidized state in a potential window of less than 1V, which allows for low-voltage device applications.

In another embodiment of the invention, where the random conjugated polymer has the -[(D)$_x$A]$_n$- structure, by varying the electron accepting strength of the A unit with a similar D unit, absorption can be confined to a broad range below 600 nm, allowing only red light to be reflected or transmitted. For example, by randomly copolymerizing 2,5-dibromo-2-ethylhexyloxy-substituted 3,4-propylenedioxythiophene and 2,5-tributylstannyl-2-ethylhexyloxy-substituted 3,4-propylenedioxythiophene, to provide PropOT-(CH$_2$OEtHx)$_2$ units with 5,8-dibromo-2,3-dihexylquinoxaline with feed ratios of about 0.75:1:0.25, a red-to-transmissive switching copolymer is formed that displays a broad absorption from about 400 to about 600 nm.

In another embodiment of the invention, where the random conjugated polymer has a -[(DA)$_x$-(D'A)$_y$]$_n$- structure with D and A units alternating but with two D units are randomly placed along the chain, a neutral state green copolymer that absorbs red and blue light can be prepared where the energy gap can be finely tuned by the copolymer composition. For example, 2,5-tributylstannyl-2-ethylhexyloxy-substituted 3,4-propylenedioxythiophene and 5,7-dibromo-2,3-dimethylthieno[3,4-b]pyrazine, which in a 1 to 1 ratio achieves an alternating copolymer that switches between green and transparent, when blended with a 2,5-tributylstannyl-3,4-ethylenedioxythiophene into the copolymerization mixture, EDOT D unit as well as ProDOT-(CH$_2$OEtHx)$_2$ D units reside in the copolymer, modifying the absorption band of the copolymer in a finely controlled manner.

In some embodiments of the invention the substituents on the D units or D and A units of the random conjugated copolymer comprise non-polar side chains. In other embodiments the substituents comprise polar or ionic side chains, including, but not exclusive to: ether, ester, amide, carboxylic acid, sulfonate, and amine functionalized chains. By the incorporation of polar or ionic substituents, the random conjugated copolymer can be designed to adsorb on metal or metal oxide surfaces, for example, but not limited to, titania for used in solar cells (Graetzel Cells) or other devices. Having a substituent that can impart a very different solubility than that of another electrochromic polymer, which is of a like or different type to those of the present invention, allows the formation of a complex electrochromic device by a layer-by-layer deposition process.

In some embodiments of the invention using a 3,4-alkylenedioxythiophenes substituted on the alkylene bridge, the substituent can be designed as to permit processing of the random conjugated copolymer into a film that can be subsequently converted to a different copolymer and, for example, a soluble film can be converted into an insoluble film. For example, where the 3,4-alkylenedioxythiophene is a diester substituted 3,4-propylenedioxythiophene, conversion of the ester groups to carboxylic acid groups can be carried out in the manner disclosed in Reynolds et al. International Patent Application Publication WO 2007/087587A2, Aug. 2, 2007, and incorporated by reference herein. If desired, the resulting di-acid can be subsequently converted into a di-carboxylate salt.

The random conjugated copolymers according to embodiments of the invention can be used for a host of applications and devices. The copolymers can be used as a component of: electrochromic windows, mirrors, or displays; polymer photovoltaics to harvest solar energy and generate electricity; other photovoltaic devices; electronic paper; anti-stat conductors and transparent conductors; field effect transistors, supercapacitors, batteries, and other electronic components; and near IR detectors. For example, one such application is as active layers in bulk heterojunction solar cells. The substituents on the donor groups can be of a structure that directs and enhances adsorption of the copolymer to metal oxides through polar carboxylate or even phosphate functionalities for use in dye sensitized solar cells, where the copolymer functions as the active light absorbing layer. Another use for random conjugated copolymers according to embodiments of the invention is that of a charge transport layer in field-effect transistor devices.

Methods and Materials

A series of random conjugated copolymers with -[(D)$_x$A]$_n$- structures with different monomer feed ratio were prepared using the reactions indicated in FIG. 1 and summarized in Table 1, below. Absorption spectra for the various copolymers are shown in FIG. 2. Copolymers PS-3-s1 and PS-3-s2 display results that are consistent with those of PS-3 in terms of molecular weight ($M_n$), PDI and solution absorption as can be seen in Table 1 and FIG. 2c. By controlling the feed ratio of the monomers, effective and consistent directed manipulation of the absorption pattern for the copolymers was achieved. The copolymerization methods according to embodiments of the invention, yield consistent molecular weights and optical spectra.

Figure 2A:
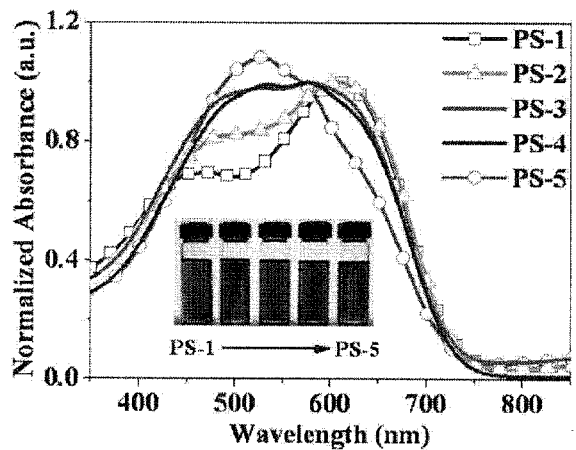
FIG. 2 shows plots of a) chloroform solution absorption spectra for copolymer PS-1-PS-5 of the compositions in Table 1, b) film absorption spectra for copolymer PS-1-PS-5 spray-cast onto ITO-coated glass from toluene (2 mg/mL), c) chloroform solution absorption spectra of copolymer PS-3, PS-3-s1 and PS-3-s2, d) chloroform solution absorption spectra of copolymer PS-4, PS-4-s1 and PS-4-s2, and e) chloroform solution absorption spectra of copolymer PS-3-s3, PS-4-s1, PS-6, and PS-7, where all spectra are normalized at the longer-wavelength absorption maximum of the polymers according to embodiments of the invention.

The UV-visible absorption spectrum for the series of -[(D)$_x$A]$_n$- type random conjugated copolymers in chloroform is shown in FIG. 2a. Visible absorption spectra of typical donor-acceptor polymers generally have two distinct absorption bands. In contrast, the spectra of random conjugated copolymers PS-1 through PS-5 show a "merging" of the short- and long-wavelength optical transition with no obvious peak to peak window. Of these copolymers, PS-1, which has a relatively low concentration of electron-rich repeating units, exhibits the lowest intensity of the short-wavelength absorption centered at 461 nm. Considering the reduced absorption of blue and green light (400-580 nm), as well as an absence of dark-red light absorption from 700 to 750 nm, the solution of PS-1 gives a blue color. By increasing the relative amount of ProDOT-(CH$_2$OEtHx)$_2$ units, the difference in intensity between the two absorption bands reduces and the high-energy and low-energy transitions show a bathochromic and hypsochromic shift, respectively. Where the D/A ratio is approximately 7, the intensities of the two absorption band are balanced, and homogenous absorption is observed across most of the visible spectrum (450-650 nm) for PS-3 and PS-4. Solutions of PS-3 and PS-4 have similar intense purple-black color, as they lack absorption in the far blue and red regions. The absorption of PS-5 shows a higher intensity for the high energy transition (530 nm) than its low energy transition (572 nm) with an increase of the donor concentration. Polymer PS-4-s1 and PS-4-s2 were synthesized using identical monomer ratio as polymer PS-4. The three polymers showed nearly identical solution absorption in the visible region, FIG. 2d.

Figure 2B:
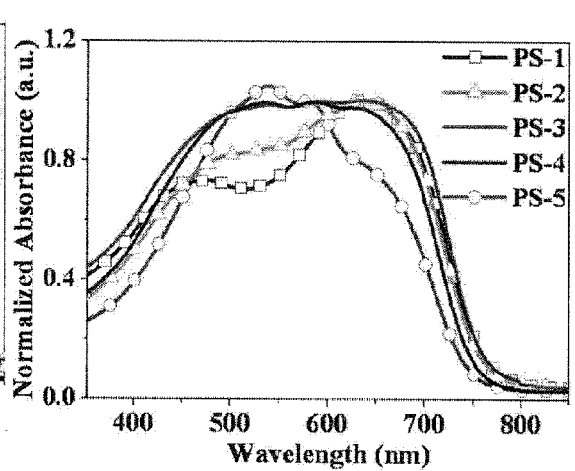
Figure 2C:
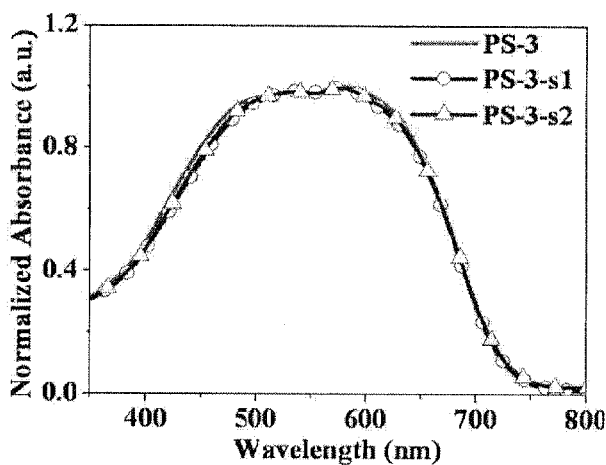
Figure 2D:
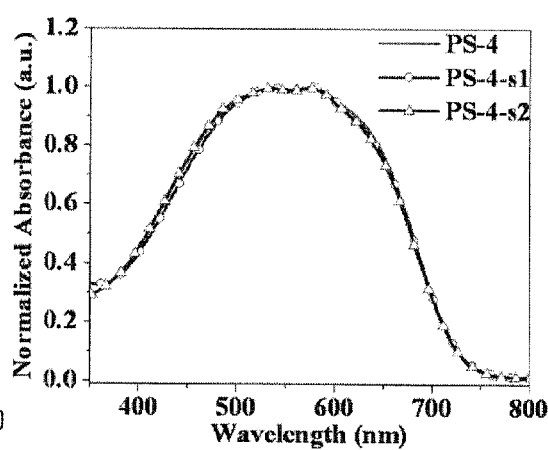
Figure 2E:
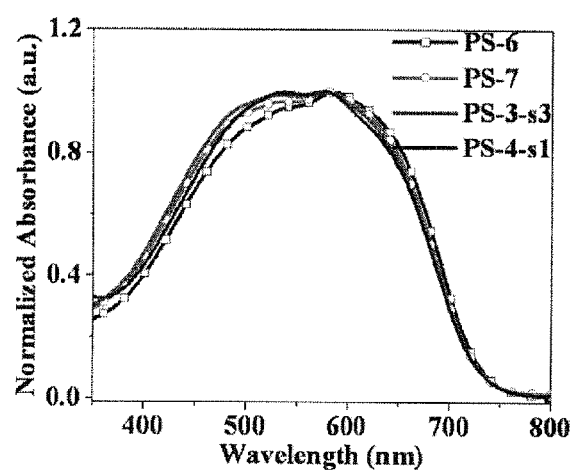

Random copolymers PS-6 and PS-7 were prepared with the small variation in the monomer feed ratio indicated in Table 1, below. As can be seen in FIG. 2e, the solution absorption of PS-6 displays a lower intensity of the high energy transition (530 nm) than that for the low energy transition (600 nm) with a lower donor concentration. By increasing the donor concentration (lowering the donor concentration) by only 0.005%, polymer PS-7 showed relatively higher absorption intensity in the high energy transition. These small changes in the polymer's structure result in discernable variations in the polymer's solution absorption, but the differences in the absorption spectra are not distinguishable with the naked eye in either solution or solid states of the polymers.

Thin films of copolymers PS-1 through PS-5 were spray-cast as films onto indium tin oxide (ITO) coated glass slides from 2 mg/mL$^{-1}$ toluene solutions. The visible absorption spectra of the films exhibit a red-shift (7-25 nm) in the solid state compared to solution for all five polymers, as shown in FIG. 2b. As determined from the onset of their neutral-state lower-energy optical transition, the five copolymers polymers have a band gap ranging from 1.6-1.7 eV.

TABLE 1

Copolymers as illustrated in FIG. 1

| | Donor 4 | Donor 5 | Acceptor 6 | $M_n$ (g/mol) | $M_w$ (g/mol) | PDI |
|---|---|---|---|---|---|---|
| PS-1 | 1 | 0.6 | 0.4 | 9,700 | 15,500 | 1.6 |
| PS-2 | 1 | 0.7 | 0.3 | 10,900 | 15,200 | 1.4 |
| PS-3 | 1 | 0.75 | 0.25 | 10,500 | 14,300 | 1.4 |
| PS-3-s1 | 1 | 0.75 | 0.25 | 11,100 | 14,400 | 1.3 |
| PS-3-s2 | 1 | 0.75 | 0.25 | 10,200 | 13,700 | 1.3 |
| PS-3-s3 | 1 | 0.75 | 0.25 | 10,500 | 15,000 | 1.4 |
| PS-4 | 1 | 0.76 | 0.24 | 11,000 | 14,200 | 1.3 |
| PS-4-s1 | 1 | 0.76 | 0.24 | 12,700 | 18,200 | 1.4 |
| PS-4-s2 | 1 | 0.76 | 0.24 | 12,000 | 19,000 | 1.6 |
| PS-5 | 1 | 0.8 | 0.2 | 14,400 | 19,000 | 1.3 |
| PS-6 | 1 | 0.735 | 0.265 | 18,000 | 29,000 | 1.6 |
| PS-7 | 1 | 0.74 | 0.26 | 12,000 | 17,100 | 1.5 |

Figure 3A:
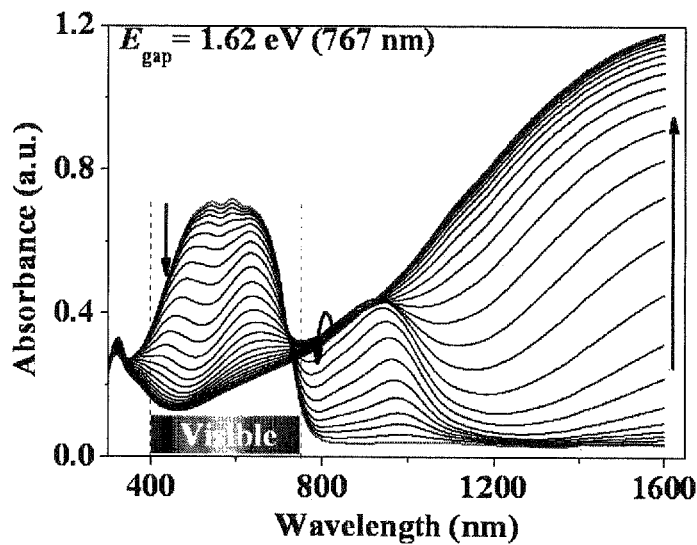
FIG. 3 shows a) absorption plots for the spectroelectrochemistry of copolymer PS-3 films spray-cast onto ITO-coated glass from toluene (2 mg/mL) with electrochemical oxidation in 0.1M LiBTI/PC, supporting electrolyte using a silver wire quasi reference electrode (calibrated against Fc/Fc$^+$), and a platinum wire counter electrode for applied potentials in 25 mV steps from −0.25 to +0.35 V vs. Fc/Fc$^+$; with b) the relative luminance as a function of applied potential for spray-coated PS-3 with L*a*b* values of fully neutral and oxidized states; and c) square-wave potential-step chronoabsorptometry plots for copolymer PS-3 spray-coated on ITO and monitored at 540 nm, −0.72 to +0.48 V vs. Fc/Fc$^+$ in 0.1M LiBTI/PC electrolyte solution for step times of 10 s, 2 s and 1 s according to an embodiment of the invention.

FIG. 3a shows the spectroelectrochemical behavior of random conjugated copolymer PS-3 by analysis of films spray-cast from a 2 mg/mL$^{-1}$ toluene solutions onto a ITO-coated glass slide. The film was redox cycled to a stable and reproducible switch prior to the analysis, and then electrochemically oxidized from −0.25 to +0.35 V vs. Fc/Fc$^+$ in 25 mV steps. The electrochemical oxidation of the films was carried out in 0.1M LiBTI/PC as the supporting electrolyte using a silver wire as a quasi reference electrode that was calibrated against Fc/Fc and a platinum wire as the counter electrode.

Upon oxidization of the copolymer, the broad absorption in the visible region is depleted and a polaronic transition in the near-IR (800-1200 nm) rises and then falls as a bipolaronic transition further into the NIR. When fully oxidized, the bipolaronic absorption peaks beyond 1600 nm, effectively bleach in the visible absorption, allowing a remarkably high level of transparency to the human eye. Furthermore, electrochromic contrasts as a percent transmittance change, Δ% T, as high as 51%, 46% and 41% are observed at wavelengths of 540, 591 and 635 nm, respectively.

Figure 3B:
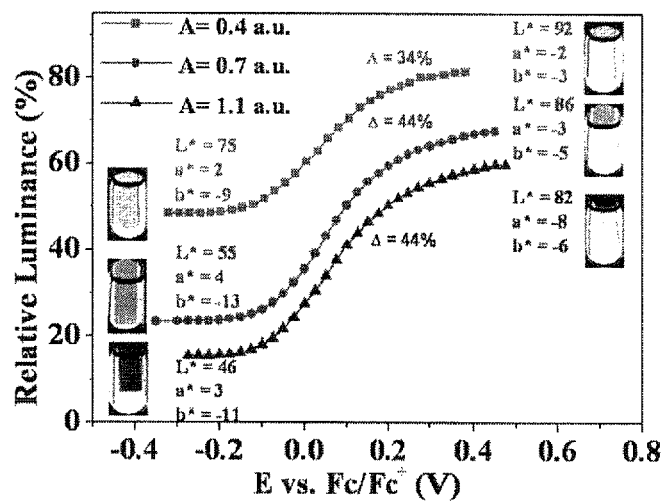

The color changes of the random conjugated copolymers upon electrochemical switching were evaluated on the basis of the "Commission Internationale de l'Eclairage" 1976 L*a*b* color standards. Three PS-3 films with varying thicknesses were subjected to the colorimetric analysis. The determined relative luminance change, which estimates the brightness of the transmitted light as a percentage of the brightness of the light source calibrated to the sensitivity of the human eye, was measured as a function of the doping level is plotted in FIG. 3b. In their neutral state, the copolymer films exhibit L* values from 46 for the thickest film to 75 for the thinnest film. The film with absorption maximum of 1.1 a.u. displays a deep black color with a* and b* values as low as 3 and −11, whereas the fully oxidized copolymer films exhibit high L* values, from 82 to 92, with small a* and b* values, demonstrating that this copolymer is able to reach a near colorless state as defined by the L*a*b* color coordinates.

Figure 3C:
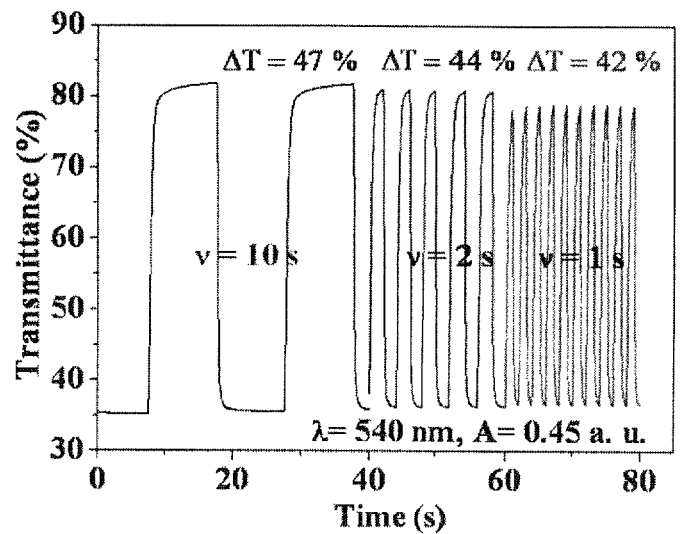

The switching rate for the PS-3 thin film was examined by monitoring the transmittance change (EC contrast, Δ% T) that is observed as a function of time at 540 nm over a potential range of −0.72 to +0.48 V vs. Fc/Fc$^+$ in 0.1M LiBTI/PC electrolyte solution upon applying square-wave potential steps of 10, 2 and 1 s. As shown in FIG. 3c, a transmittance change, monitored at 540 nm, as high as 47% is observed at a long switch time (10 s), and decreases to 1 s, which reduces the contrast to 42%.

Figure 4:
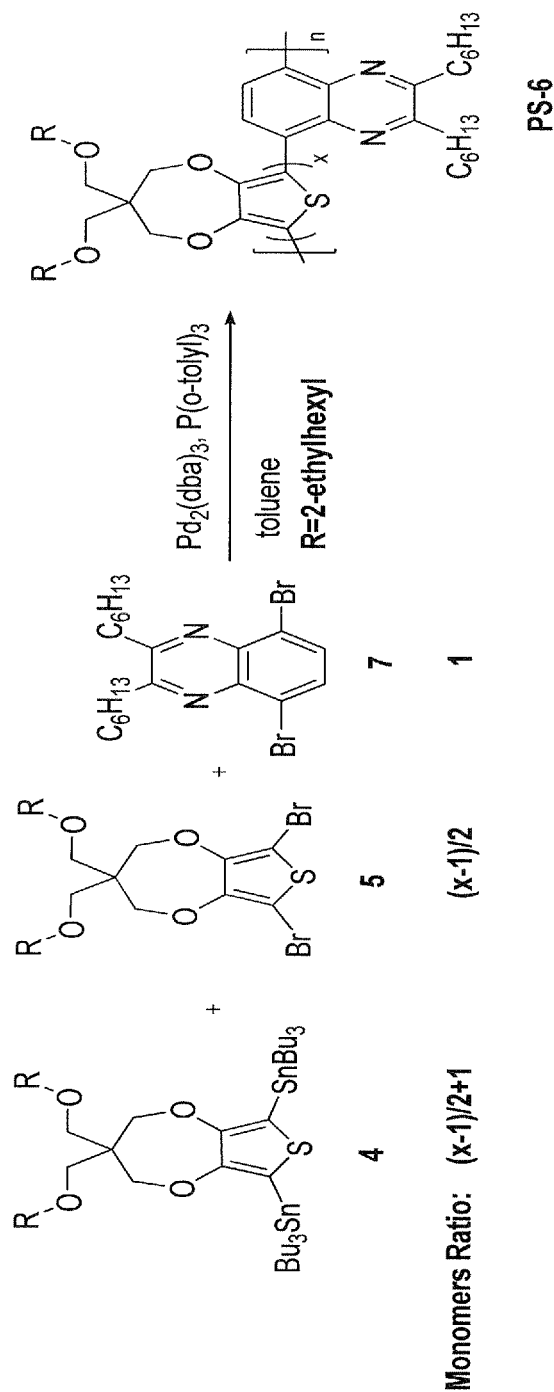
FIG. 4 shows the polymerization of 4 and 5 with dibromo dioctyquinoxaline (7) to yield a random conjugated copolymer PS-6 (monomers ratio: 1:0.75:0.25) according to embodiments of the invention.
Figure 5A:
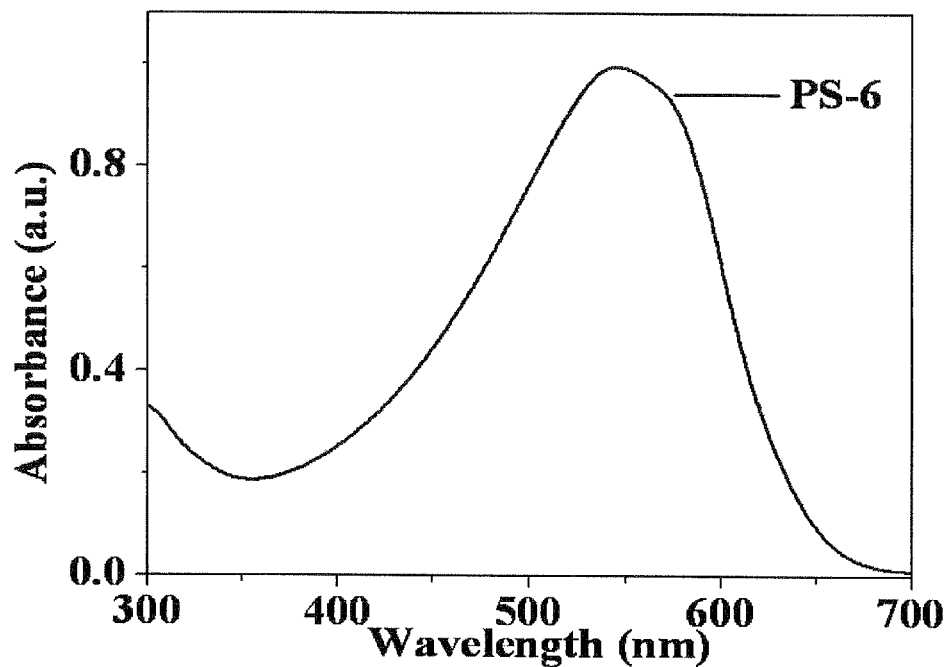
FIG. 5 shows a) the solution absorption spectrum of random conjugated copolymer PS-6 (monomers ratio: 1:0.75: 0.25) and b) the absorption spectra for the spectroelectrochemistry of PS-6 spray-cast onto ITO-coated glass from toluene (2 mg/mL) with electrochemical oxidation carried out in 0.1M LiBTI/PC using a silver wire quasi reference electrode and a platinum wire counter electrode for the applied potentials 0.07, 0.17, 0.22, 0.295, 0.32, 0.37 and 0.52 V vs. Fc/Fc$^+$ according to an embodiment of the invention.
Figure 5B:
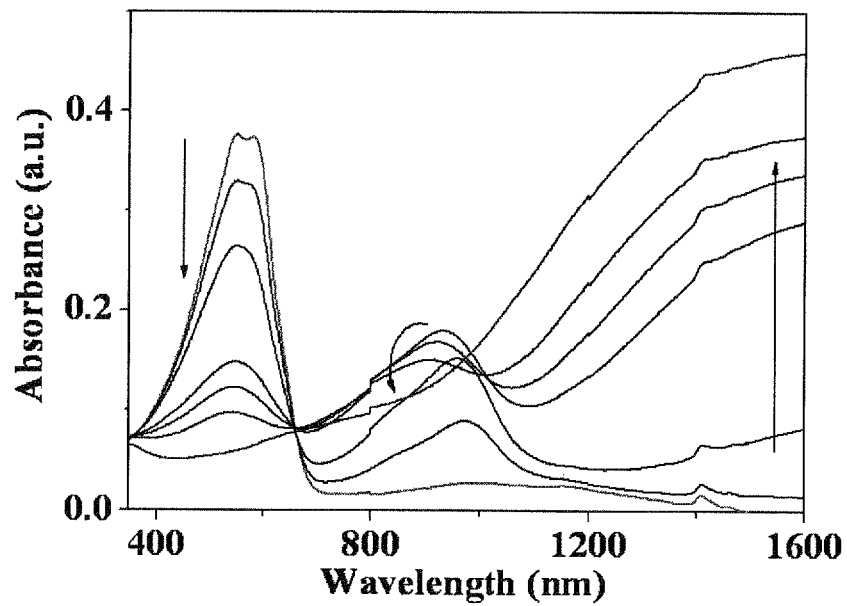

Random conjugated copolymers with -[(D)$_x$A]$_n$- structures were designed to allow red to transmissive ECPs by the random polymerization of 2,5-dibromo-2-ethylhexyloxy-substituted 3,4-propylenedioxythiophene and 2,5-tributyl-stannyl-2-ethylhexyloxy-substituted 3,4-propylenediox-ythiophene to provide (ProDOT-(CH$_2$OEtHx)$_2$) repeating units with 5,8-dibromo-2,3-dihexylquinoxaline in a feed ratio of 0.75:1:0.25, as indicated in FIG. 4 for copolymer PS-6. The toluene solution of the copolymer has a red color while the spray-casted thin film of PS-6 appear purple due to a red shift of the absorption that allows some blue light to pass through as shown in FIG. 5a. Switching to a highly transmissive state upon oxidation can be seen in FIG. 5b. The films were spray-cast onto ITO-coated glass from a 2 mg/mL toluene solution. Electrochemical oxidation of the films was carried out in 0.1M LiBTI/PC supporting electrolyte with a silver wire as a quasi reference electrode, and a platinum wire as the counter electrode. The applied potential was 0.07, 0.17, 0.22, 0.295, 0.32, 0.37 and 0.52 V vs. Fc/Fc.

Figure 6:
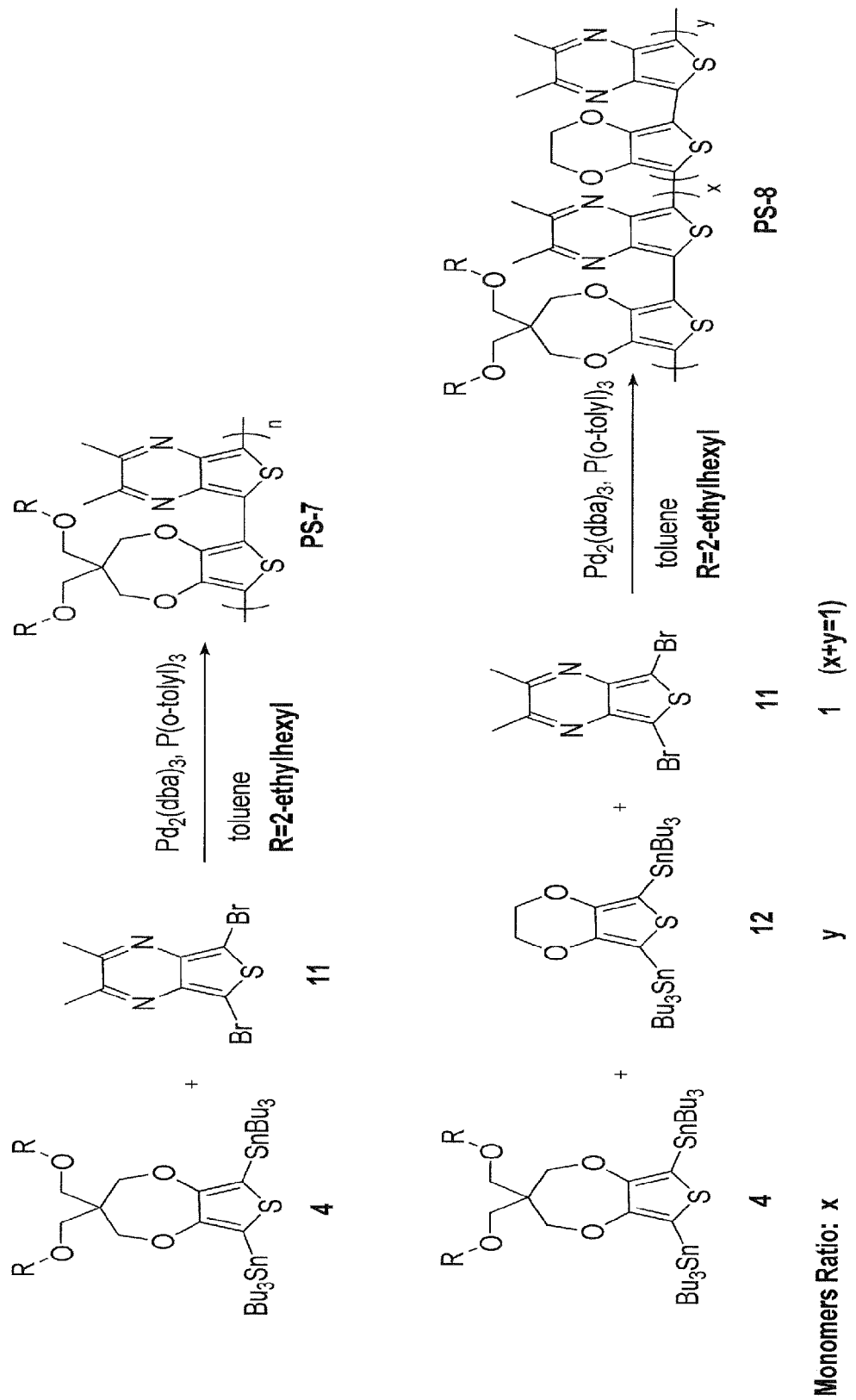
FIG. 6 shows a synthetic scheme for the preparation of alternating copolymer PS-7 and random conjugated copolymer PS-8 according to an embodiment of the invention.
Figure 7A:
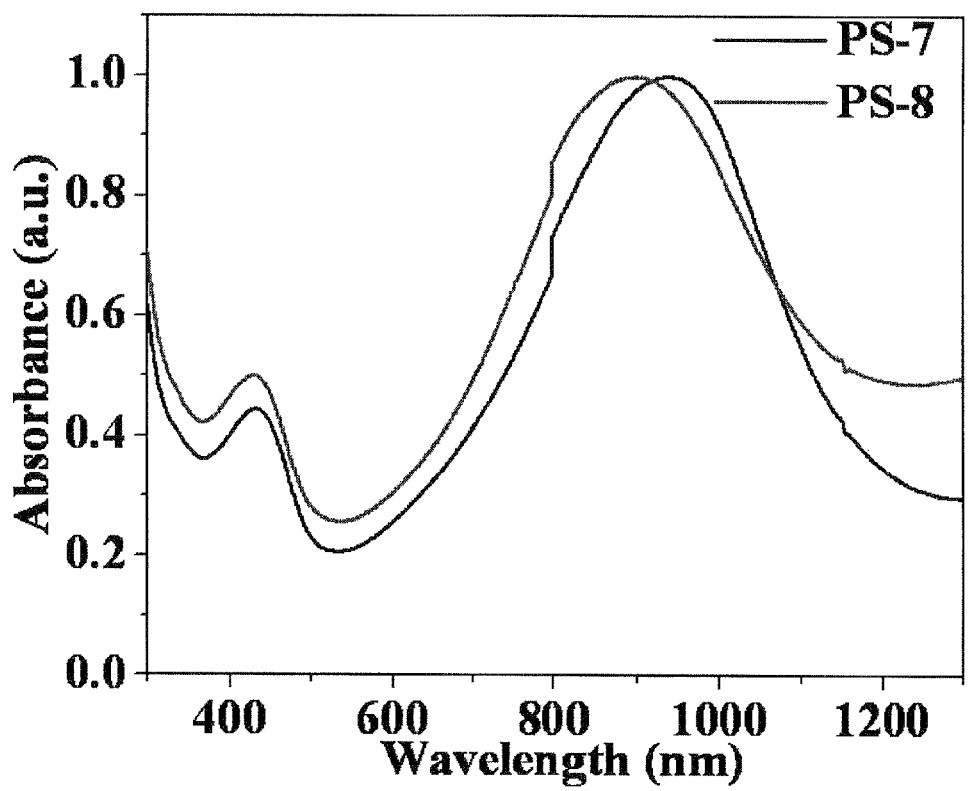
FIG. 7 shows a) the solution absorption spectra for random copolymers PS-7 and random conjugated copolymer PS-8 according to an embodiment of the invention with monomer fractions x=0.8 and, y=0.2 and b) absorption spectra for the spectroelectrochemistry of PS-7 spray-cast onto ITO-coated glass from toluene (2 mg/mL) with electrochemical oxidation carried out in 0.1M LiBTI/PC using a silver wire as a quasi reference electrode and a platinum wire as the counter electrode at applied potentials of −0.48, −0.28, −0.08, 0.12, 0.32 and 0.52 V vs. Fc/Fc$^+$ according to an embodiment of the invention.
Figure 7B:
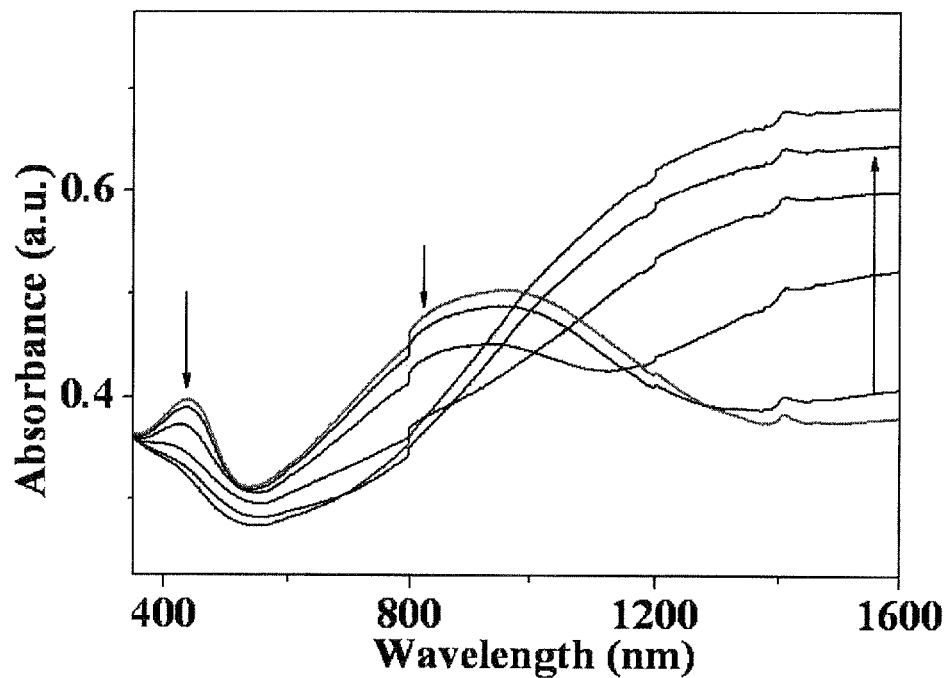

A strictly alternating copolymer, PS-7, having ProDOT-$(CH_2OEtHx)_2$ for D units and thieno[3,4-b]pyrazine for A units is shown in FIG. 6. A green color is observed in both the toluene solution and the thin film with absorptions centered in the visible region (450 nm) and in the near IR region (950 nm) as shown in FIG. 7a. Upon oxidization of the alternating copolymer, the absorption in the visible region (450 nm) as well as the absorption in the near IR region (950 nm) are depleted, and when fully oxidized, the visible absorption is effectively bleached as can be seen in FIG. 7b. By including ethylenedioxy thiophene EDOT as a second D unit, the copolymer of type $-[(DA)_x-(D'A)_y]_n-$ PS-8, according to an embodiment of the invention, allow for a blue shift of the long wavelength absorption over more of the yellow, orange and red portions of the visible region as indicated in FIG. 7a.

Figure 8:
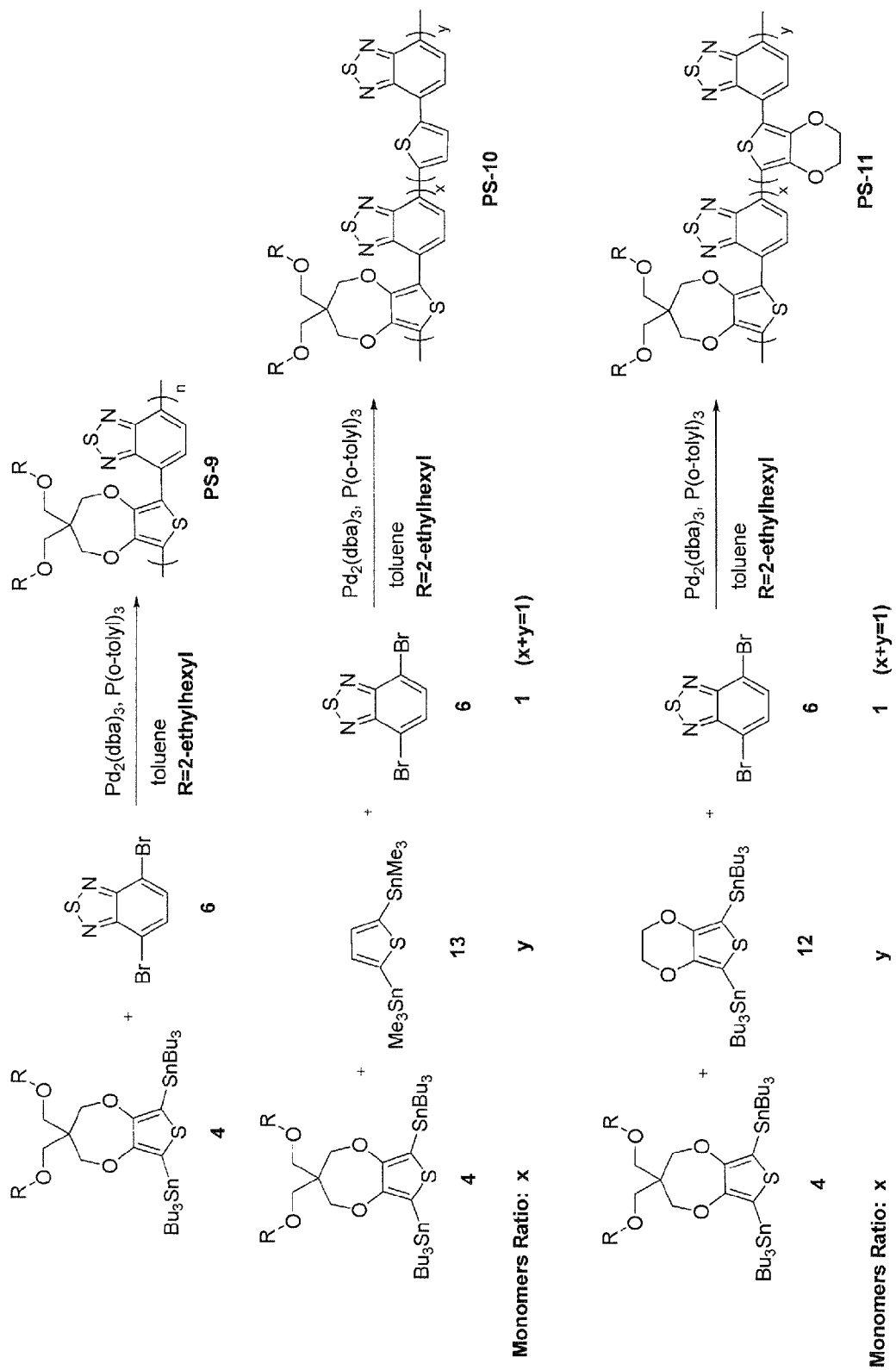
FIG. 8 shows a synthetic scheme for the preparation of alternating copolymer PS-9 and random conjugated copolymers PS-10 (monomers ratio: x=0.8, y=0.2) and PS-11 (x=0.8, y=0.2) according to embodiments of the invention.
Figure 9A:
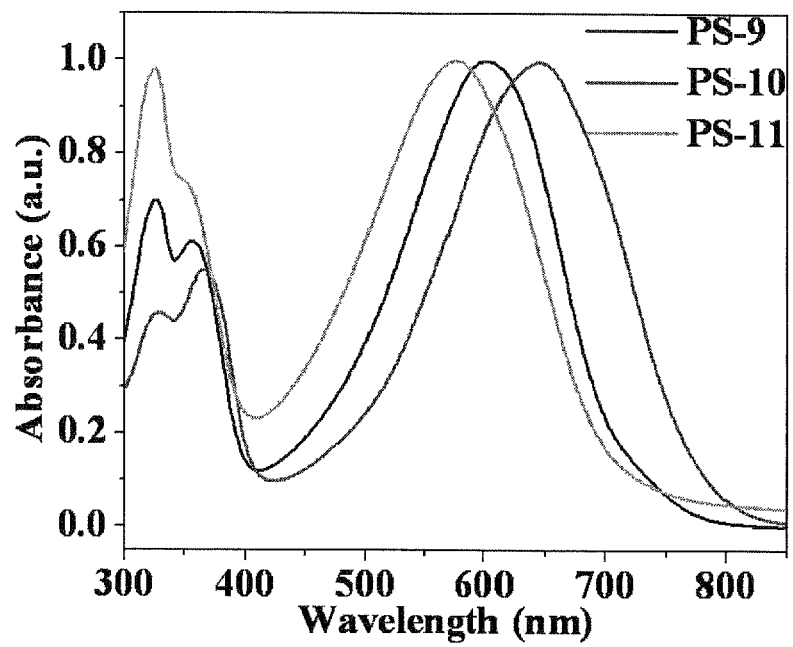
FIG. 9 shows a) the solution absorption spectra for alternating copolymer PS-9 and random conjugated copolymers PS-10 (monomers ratio: x=0.8, y=0.2) and PS-11 (x=0.8, y=0.2) and b) the absorption spectra during spectroelectrochemistry of PS-10 (x=0.8, y=0.2) for a spray-cast film on ITO-coated glass from toluene (1 mg/mL) for electrochemical oxidation of the films in 0.1M LiBTI/PC using a silver wire quasi reference electrode and a platinum wire counter electrode for applied potentials of 0.22, 0.32, 0.42, 0.52, 0.62, 0.72, 0.92 and 1.02 V vs. Fc/Fc$^+$ according to embodiments of the invention.

Three neutral state blue conjugated copolymers were prepared in the manner shown in FIG. 8, where an alternating copolymer, PS-9, and two $-[(DA)_x-(D'A)_y]_n-$ type random conjugated copolymers, PS-10 and PS-11, according to an embodiment of the invention were examined. By replacing a controlled portion of the 2,5-bis(tributylstannyl)-PropOT monomer with 2,5-bis(tributylstannyl)-EDOT or 2,5-bis (tributylstannyl)-thiophene monomers, a fine tuning of the relative intensity of the two absorption bands as well as the wavelengths of the absorption maxima can be made. For example, PS-10 shows a clear red-shift in the high wavelength absorption compared to the alternating copolymer PS-9, while PS-11 shows a blue-shift in the same region relative to PS-9 with an increase of the low wavelength absorption intensity as can be seen in FIG. 9a.

Figure 9B:
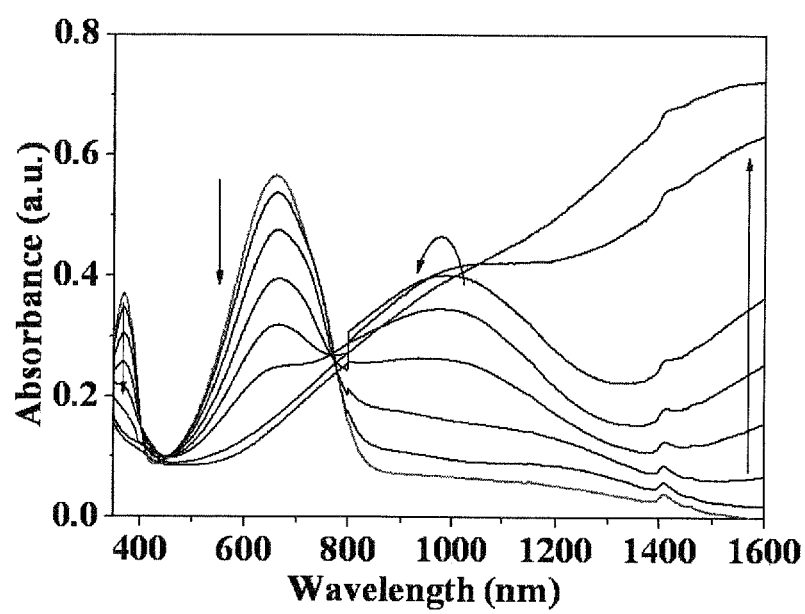

FIG. 9b shows the spectroelectrochemical behavior of a PS-10 film. The depletion of the neutral-state optical absorption of the copolymer was accompanied by the concomitant formation of new transitions arising in the near-IR region of the spectrum, indicating the development of radical cations (polarons), further combining into dications (bipolarons) at higher biases. Thin film of polymer PS-10 can switch from blue to highly transmissive upon oxidation.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A random conjugated copolymer, comprising the structure $-[(D)_xA]_n-$, wherein x is greater than 1 and polydispersed comprising a plurality of one or more different donor (D) repeating units and a plurality of at least one acceptor (A) repeating unit, wherein at least one of the D units has a solubilizing substituent and comprises a 3,4-alkylenedioxythiophene substituted on the alkylene bridge, wherein statistically a portion of the A repeating units are separated from another of the A units by only one of the D units, wherein a plurality of the A unit are adjacent to the D units having the solubilizing substituents, and wherein the copolymer in the neutral state is black or colored and highly transmissive in the oxidized state.

2. The random conjugated copolymer of claim 1 wherein the 3,4-alkylenedioxythiophene substituted on the alkylene bridge comprises:

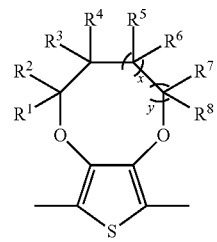

where x is 0 or 1, y is 0 or 1, and $R^1, R^2, R^3, R^4, R^5, R^6, R^7$ and $R^8$ are independently H, $C_1-C_{30}$ alkyl, $C_2-C_{30}$ alkenyl, $C_2-C_{30}$ alkynyl, $C_6-C_{14}$ aryl, $C_7-C_{30}$ arylalkyl, $C_8-C_{30}$ arylalkenyl, $C_8-C_{30}$ arylalkynyl, hydroxy, $C_1-C_{30}$ alkoxy, $C_6-C_{14}$ aryloxy, $C_7-C_{30}$ arylalkyloxy, $C_2-C_{30}$ alkenyloxy, $C_2-C_{30}$ alkynyloxy, $C_8-C_{30}$ arylalkenyloxy, $C_8-C_{30}$ arylalkynyloxy, $CO_2H$, $C_2-C_{30}$ alkylester, $C_7-C_{15}$ arylester, $C_8-C_{30}$ alkylarylester, $C_3-C_{30}$ alkenylester, $C_3-C_{30}$ alkynylester $NH_2$, $C_1-C_{30}$ alkylamino, $C_6-C_{14}$ arylamino, $C_7-C_{30}$ (arylalkyl)amino, $C_2-C_{30}$ alkenylamino, $C_2-C_{30}$ alkynylamino, $C_8-C_{30}$ (arylalkenyl) amino, $C_8-C_{30}$ (arylalkenyl)amino, $C_2-C_{30}$ dialkylamino, $C_{12}-C_{28}$ diarylamino, $C_4-C_{30}$ dialkenylamino, $C_4-C_{30}$ dialkynylamino, $C_7-C_{30}$ aryl(alkyl)amino, $C_7-C_{30}$ di(arylalkyl) amino, $C_8-C_{30}$ alkyl(arylalkyl)amino, $C_{15}-C_{30}$ aryl(arylalkyl)amino, $C_8-C_{30}$ alkenyl(aryl)amino, $C_8-C_{30}$ alkynyl(aryl) amino $C(O)NH_2$ (amido), $C_2-C_{30}$ alkylamido, $C_7-C_{14}$ arylamido, $C_8-C_{30}$ (arylalkyl)amido, $C_2-C_{30}$ dialkylamido, $C_{12}-C_{28}$ diarylamido, $C_8-C_{30}$aryl(alkyl)amido, $C_{15}-C_{30}$di (arylalkyl)amido, $C_9-C_{30}$alkyl(arylalkyl)amido, $C_{16}-C_{30}$ aryl (arylalkyl)amido, thiol, $C_1-C_{30}$ alkhydroxy, $C_6-C_{14}$ arylhydroxy, $C_7-C_{30}$ arylalkyihydroxy, $C_3-C_{30}$ alkenylhydroxy, $C_3-C_{30}$ alkynylhydroxy, $C_8-C_{30}$ arylalkenylhydroxy, $C_8-C_{30}$ arylalkynylhydroxy, $C_3-C_{30}$ polyether, $C_3-C_{30}$ polyetherester, $C_3-C_{30}$ polyester $C_3-C_{30}$ polyamino, $C_3-C_{30}$ polyaminoamido, $C_3-C_{30}$ polyaminoether, $C_3-C_{30}$ polyaminoester, or $C_3-C_{30}$ polyamidoester.

3. The random conjugated copolymer of claim 1, wherein the A unit comprises:
benzo[c][1,2,5]thiadiazole, benzo[c][1,2,5]oxadiazole, quinoxaline, benzo[d][1,2,3]triazole, pyrido[3,4-b]pyrazine, cyanovinylene, thiazolo[5,4-d]thiazole, 1,3,4-thiadiazole, pyrrolo[3,4-c]pyrrole-1,4-dione, 2,2'-bithiazole, [1,2,5]thiadiazolo[3,4-c]pyridine, thieno[3,4-b]pyrazine, [1,2,5]oxadiazolo[3,4-c]pyridine, dicyanovinylene, [1,2,5]thiadiazolo[3,4-g]quinoxaline, 4-dicyanomethylenecyclopentadithiolene, benzo[c]thiophene or any derivative thereof.

4. A method of preparing a random conjugated copolymer comprising:
providing at least two monomer comprising a D unit, wherein at least one of the monomers includes a substituted D unit comprising a 3,4-alkylenedioxythiophene substituted on the alkylene bridge, wherein one or more first D unit comprising monomer have a pair of first reactive groups and at least one of the first D unit comprising monomers is a substituted D unit, and one or more second D units comprising monomers have a pair of second reactive groups that react with the first reactive group;

providing at least one monomer comprising an A unit comprising benzo[c][1,2,5]thiadiazole, benzo[c][1,2,5]oxadiazole, quinoxaline, benzo[d][1,2,3]triazole, pyrido[3,4-b]pyrazine, cyanovinylene, thiazolo[5,4-d]thiazole, 1,3,4-thiadiazole, pyrrolo[3,4-c]pyrrole-1,4-dione, 2,2'-bithiazole, [1,2,5]thiadiazolo[3,4-c]pyridine, thieno[3,4-b]pyrazine, [1,2,5]oxadiazolo[3,4-c]pyridine, dicyanovinylene, [1,2,5]thiadiazolo[3,4-g]quinoxaline, 4-dicyanomethylenecyclopentadithiolene, benzo[c]thiophene or any derivative thereof wherein the A unit has a pair of the second reactive groups; and polymerizing the D units with the A units, wherein the resulting random conjugated copolymer has the structure $-[(D)_xA]_n-$, where $x>1$ and $n(x+1)>10$.

\* \* \* \* \*

UNITED STATES PATENT AND TRADEMARK OFFICE
CERTIFICATE OF CORRECTION

PATENT NO. : 8,450,449 B2
APPLICATION NO. : 13/111350
DATED : May 28, 2013
INVENTOR(S) : John R. Reynolds et al.

It is certified that error appears in the above-identified patent and that said Letters Patent is hereby corrected as shown below:

Title Page
(57) Abstract,
Line 6, "one D units" should read --one D unit--.
Line 7, "one the D units" should read --one of the D units--.
Line 12, "[(DA))$_x$-(D'A)$_y$]$_n$" should read --[(DA)$_x$-(D'A)$_y$]$_n$--.
Lines 13-14, "another D units" should read --another D unit--.

In the Specification
Column 1,
Line 31, "Having a et al" should read --Havinga et al--.

Column 3,
Lines 6-7, "an A units" should read --an A unit--.
Line 25, "PropOT" should read --ProDOT--.

Column 6,
Line 41, "requires" should read --require--.

Column 7,
Lines 60-61, "$C_6$-$C_{14}$ acylamino" should read --$C_6$-$C_{14}$ arylamino--.

Column 9,
Line 15, "thiophenesuch" should read --thiophene such--.
Line 36, "PropOT" should read --ProDOT--.
Line 44, "PropOT" should read --ProDOT--.
Line 57, "PropOT" should read --ProDOT--.

Column 10,
Line 18, "for used in" should read --for use in--.

Signed and Sealed this
Eighth Day of October, 2013

Teresa Stanek Rea
*Deputy Director of the United States Patent and Trademark Office*

Column 12,
Line 23, "Fc/Fc" should read --Fc/Fc$^+$--.

Column 13,
Line 11, "Fc/Fc" should read --Fc/Fc$^+$--.
Line 32, "PropOT" should read --ProDOT--.

In the Claims
Column 14, Claim 2,
Line 33, "$C_8$-$C_{30}$ (arylalkenyl)amino" should read --$C_8$-$C_{30}$ (arylalkynyl)amino--.
Line 43, "$C_7$-$C_{30}$ arylalkyihydroxy" should read --$C_7$-$C_{30}$ arylalkylhydroxy--.